(12) United States Patent
Deberry, Jr. et al.

(10) Patent No.: US 8,097,058 B2
(45) Date of Patent: Jan. 17, 2012

(54) NOZZLE ASSEMBLY FOR SEPARATING HYDROCARBON EMULSIONS AND METHODS OF SEPARATING HYDROCARBON EMULSIONS

(75) Inventors: Kenneth E. Deberry, Jr., Anchorage, AK (US); Craig R. Green, Big Lake, AK (US)

(73) Assignee: Britewater International, LLC, Southlake, TX (US)

( * ) Notice: Subject to any disclaimer, the term of this patent is extended or adjusted under 35 U.S.C. 154(b) by 383 days.

(21) Appl. No.: 12/380,117

(22) Filed: Feb. 24, 2009

(65) Prior Publication Data

US 2010/0213144 A1 Aug. 26, 2010

Related U.S. Application Data

(60) Provisional application No. 61/069,271, filed on Mar. 13, 2008.

(51) Int. Cl.
*B01D 45/08* (2006.01)
(52) U.S. Cl. .......... 55/462; 95/267; 55/468; 55/DIG. 14
(58) Field of Classification Search .................... 55/462, 55/465, 468, DIG. 14; 96/220, 206, 204; 210/708, 710, 723, 737, 766, 727, 728, 787, 210/198.3; 95/32, 267, 253, 262, 248
See application file for complete search history.

(56) References Cited

U.S. PATENT DOCUMENTS

| 3,084,874 | A | | 4/1963 | Jones et al. | |
|---|---|---|---|---|---|
| 4,120,670 | A | * | 10/1978 | Pircon | 95/216 |
| 4,274,846 | A | * | 6/1981 | Smith | 73/863.22 |
| 4,483,697 | A | * | 11/1984 | Deysson et al. | 96/210 |
| 4,744,958 | A | * | 5/1988 | Pircon | 422/606 |
| 4,938,876 | A | * | 7/1990 | Ohsol | 210/708 |
| 5,341,832 | A | * | 8/1994 | Foust | 137/202 |
| 5,409,514 | A | * | 4/1995 | Ragusa et al. | 55/319 |
| 5,738,762 | A | | 4/1998 | Ohsol | |
| 6,090,299 | A | * | 7/2000 | Hays et al. | 210/787 |
| 6,200,486 | B1 | * | 3/2001 | Chahine et al. | 210/748.03 |
| 6,368,512 | B1 | * | 4/2002 | Wirz et al. | 210/780 |

(Continued)

FOREIGN PATENT DOCUMENTS

GB 371484 4/1932

(Continued)

OTHER PUBLICATIONS

Citing the definition of "fluid" as found in Merriam-Webster Dictionary online. www.merriam-webster.com/dictionary/fluid (May 26, 2011).*

(Continued)

*Primary Examiner* — Duane Smith
*Assistant Examiner* — Pankti Patel
(74) *Attorney, Agent, or Firm* — Charles D. Gunter, Jr.

(57) ABSTRACT

A nozzle assembly and related methods for separating hydrocarbon emulsions in a fluid is provided. The nozzle assembly comprises an impingement plate into which hydrocarbon emulsions are ejected causing large emulsion particles in the fluid to be broken apart upon impact with the plate, thus allowing the various constituent components of the emulsion to be more easily separated. In certain embodiments, impact of the hydrocarbon emulsions into the impingement plate also expose clean surfaces on the various components of the emulsion fluid that can more easily interact with any surfactant that may be mixed with the fluid.

15 Claims, 6 Drawing Sheets

U.S. PATENT DOCUMENTS

| | | | | |
|---|---|---|---|---|
| 6,685,759 B2* | 2/2004 | Dahlin et al. | | 55/465 |
| 7,473,291 B2* | 1/2009 | Evenstad et al. | | 55/416 |
| 7,648,543 B2* | 1/2010 | Faber et al. | | 55/416 |
| 7,655,073 B2* | 2/2010 | Evenstad et al. | | 95/268 |
| 7,810,477 B2* | 10/2010 | Knauf et al. | | 123/572 |
| 7,828,865 B2* | 11/2010 | Hodges et al. | | 55/320 |
| 7,935,165 B2* | 5/2011 | Faber et al. | | 55/420 |
| 2003/0183587 A1* | 10/2003 | Hawkins | | 210/787 |
| 2006/0070963 A1* | 4/2006 | McKeary | | 210/787 |
| 2007/0256566 A1* | 11/2007 | Faber et al. | | 96/417 |
| 2009/0100811 A1* | 4/2009 | Scheckel et al. | | 55/448 |
| 2010/0180768 A1* | 7/2010 | Folkvang | | 95/253 |

FOREIGN PATENT DOCUMENTS

| | | |
|---|---|---|
| GB | 1003217 | 9/1965 |

OTHER PUBLICATIONS

Citing the definition of "housing" as found in Merriam-Webster Dictionary online. www.merriam-webster.com/dictionary/housing (May 26, 2011).*

Citing the definition of "chamber" as found in Merriam-Webster Dictionary online. www.merriam-webster.com/dictionary/chamber (May 26, 2011).*

Notification of Transmittal of the International Search Report and the Written Opinion of the International Searching Authority, dated Jun. 25, 2009 (3 pages).

International Search Report, dated Jun. 25, 2009 (3 pages).

Written Opinion of the International Searching Authority, dated Jun. 25, 2009 (7 pages).

* cited by examiner

NOZZLE ASSEMBLY FOR SEPARATING HYDROCARBON EMULSIONS AND METHODS OF SEPARATING HYDROCARBON EMULSIONS

CROSS REFERENCE TO RELATED APPLICATION

This application claims the benefit of and priority benefit to U.S. Provisional Patent Application Ser. No. 61/069,271 filed Mar. 13, 2008, titled "Nozzle Assembly for Separating Hydrocarbon Emulsions and Methods of Separating Hydrocarbon Emulsions."

BACKGROUND

1. Field of Invention

The invention relates generally to a nozzle assembly for breaking emulsions in hydrocarbon fluids, and in particular, to a nozzle assembly having an adjustable impingement plate therein for breaking hydrocarbon emulsions in crude oil.

2. Description of Art

In the processing of crude oils prior to refinery separations, the presence of intractable hydrocarbon emulsions often presents serious operational problems leading to oil losses, contamination, corrosion, fouling or plugging, and expensive environmental treatment/disposal costs. These hydrocarbon emulsions are often present when the crude is a heavy crude having an API gravity of about 20 or less, and particularly those with an API gravity from 7 to 12. These crudes are especially hard to produce, and when produced cause operational difficulties in refining.

These intractable hydrocarbon emulsions typically include as constituent components water-in-oil or oil-in-water, oil wetted and/or water wetted solids as well as a variety of additional difficult-to-separate constituent components. Some of the waxes and bitumen present with the oil in the underground formation, as well as finely divided inorganic solids such as sands or clays which act as emulsion stabilizers, provide a shield at the oil-water interface which prevents the water droplets from coalescing. These intractable emulsions pose a serious disposal problem and represent a great economic waste. Previous processes for breaking-up hydrocarbon emulsions are disclosed in U.S. Pat. Nos. 4,938,876, 5,738,762, 5,882,506, and 5,948,242, each of which is incorporated herein in its entirety.

Crude oils can also be contaminated by heavy metals and undesirable organic compounds such as oxygen, sulfur and nitrogen. These materials are usually intimately associated with the organic interfacial structures of emulsions, thus exacerbating the intractability of the emulsion and also causing corrosion and undesirable contamination in refinery processes.

Often, hard to handle, heavy crude oil in many parts of the world is, therefore, deemed uneconomic to produce and refine. Thus, there is a need for oil emulsion breaking/separation technology suitable for use adjacent to heavy crude oil producing fields where the heavy crude oil exits from the producing well combined with considerable water and solids.

It is known in the art to utilize a fluid flow nozzle, such as a Venturi nozzle, to break and separate a hydrocarbon emulsion into its various constituent components by flashing the emulsion through the nozzle and dropping the pressure of the emulsion.

SUMMARY OF THE INVENTION

The present invention advantageously provides a nozzle assembly and related methods for separating hydrocarbon emulsions contained in a fluid. Broadly, fluid nozzles having one or more impingement plates and methods of utilizing such nozzles are disclosed. The nozzle assembly and related methods disclosed herein break down a hydrocarbon emulsion in produced crude oil into its various constituent components. In one specific embodiment, the nozzle assembly also allows for selective variation in the amount of recovery for the respective constituent components. Additionally, in another specific embodiment, the nozzle assembly provides a greater amount of refinable oil to be recovered and entered into the refining process.

In one particular embodiment, a nozzle assembly comprises a housing; a housing fluid inlet; a housing fluid outlet; a flow chamber for facilitating fluid flow from the housing fluid inlet to the housing fluid outlet; a nozzle head disposed adjacent to the housing fluid outlet, the nozzle head having a first end and a second end, the first end being disposed adjacent to the housing fluid outlet, the first end and the second end defining a fluid flow passage therebetween for facilitating fluid flow from the first end to the second end; and an impingement plate disposed in a spaced relationship from the second end of the nozzle head such that fluid flow impacts the impingement plate upon exiting the second end of the nozzle head and hydrocarbon emulsions in the fluid are thereby separated into various constituent components. A further feature of the nozzle assembly is that the impingement plate may be movable with respect to the nozzle head such that the distance between the impingement plate and the second end of the nozzle head can be varied.

Large emulsion particles in the fluid are advantageously broken apart when the fluid flow from the second end of the nozzle head is directed towards, and impacts, the impingement plate. Clean surfaces on the various constituent components of the emulsion fluid are exposed when the emulsion particles are broken apart. These exposed surfaces can then more easily interact with any demulsifier that may be mixed with the fluid.

In an additional aspect, hydrocarbon emulsions contained in a fluid can be broken by causing a pressure drop in the fluid by passing the fluid through a first section of a fluid flow nozzle; focusing the directional flow of the fluid by passing the fluid through a second expanding section of the fluid flow nozzle; and deflecting the fluid off of an impingement plate in a third section of the fluid flow nozzle such that the hydrocarbon emulsions in the fluid are separated into various constituent components. In one particular embodiment, the method further comprises the step of adjusting the position of the impingement plate prior to the step of deflecting the fluid off of the impingement plate.

Figure 1:
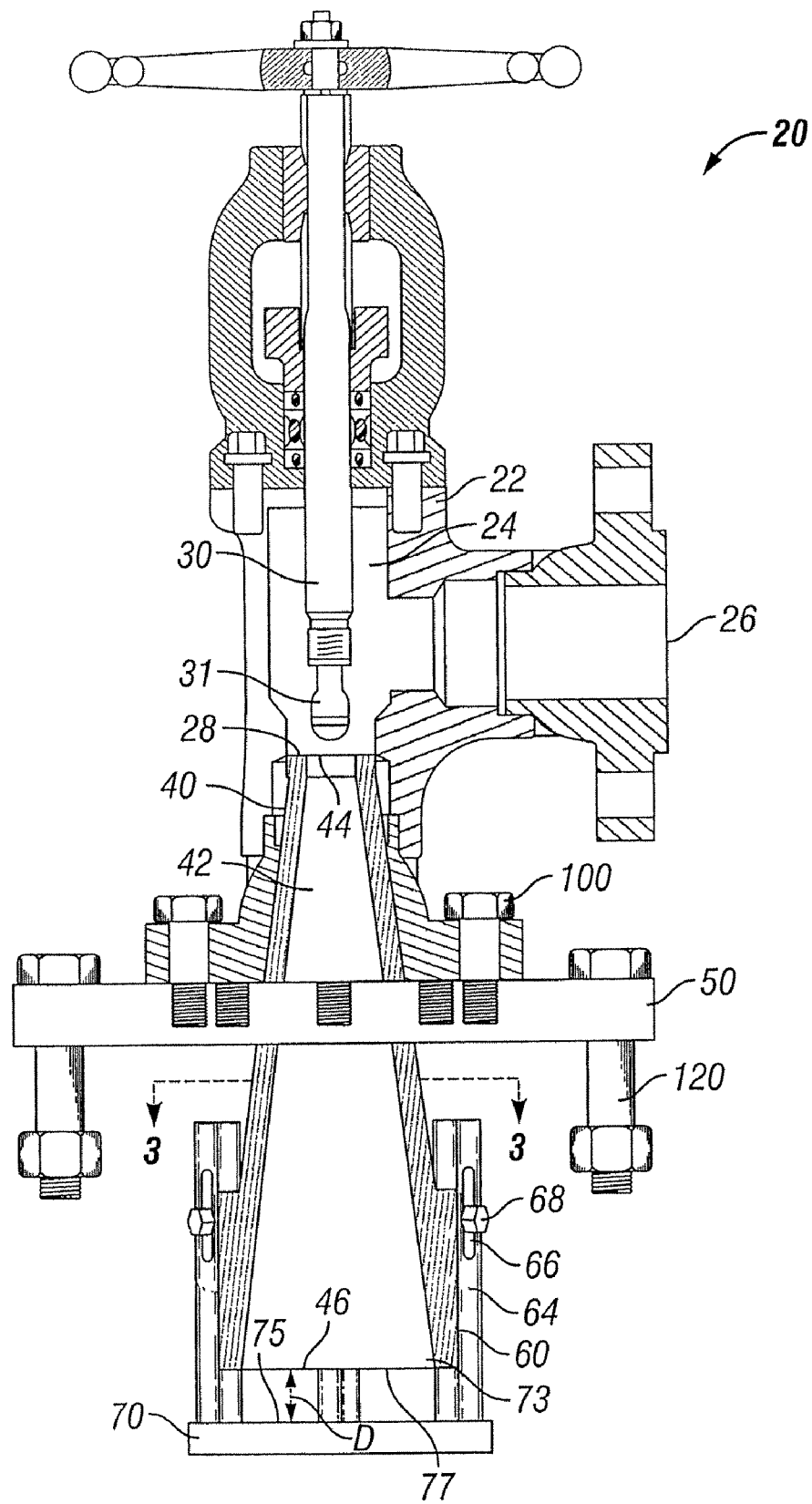
FIG. 1 is a partial cross-sectional view of a specific embodiment of a nozzle assembly for use in separating hydrocarbon emulsions.
Figure 2:
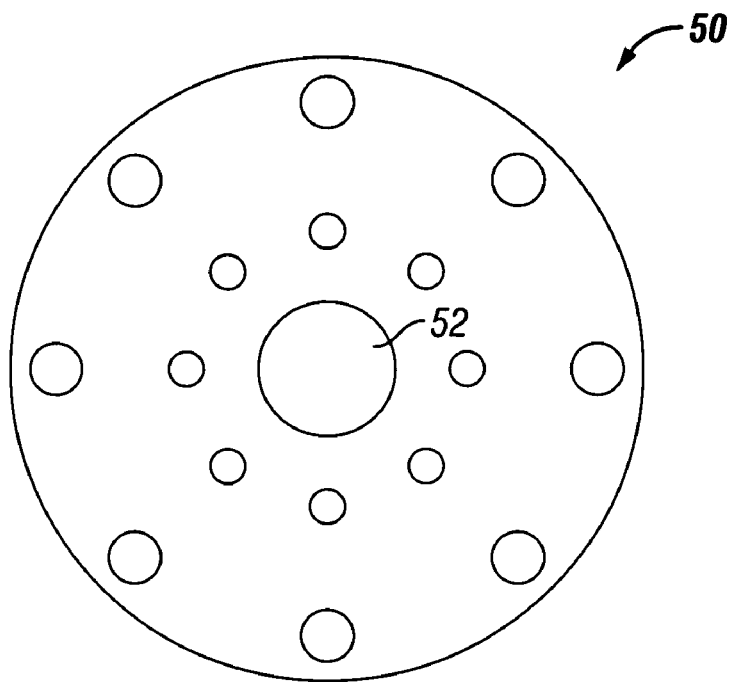
FIG. 2 is a top view of a support plate for the nozzle assembly shown in FIG. 1.
Figure 3:
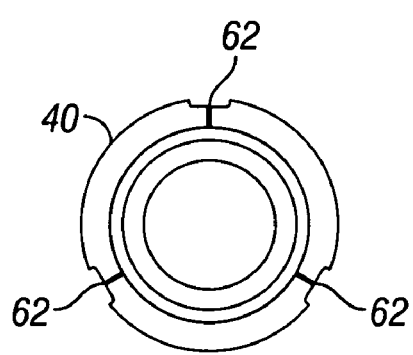
FIG. 3 is a cross-sectional view of the nozzle assembly shown in FIG. 1 along line 3-3.
Figure 4:
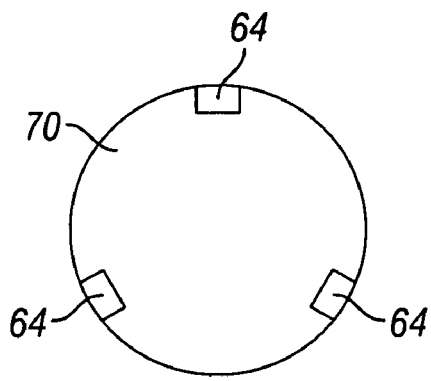
FIG. 4 is a top view of an impingement plate of the nozzle assembly shown in FIG. 1.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

Referring now to FIGS. 1-4, a nozzle assembly 20 is provided. Nozzle assembly 20 preferably comprises a low friction, isentropic nozzle that includes housing 22 and housing flow chamber 24 in fluid communication with housing fluid inlet 26 and housing fluid outlet 28. Adjustment member 30 with button plug 31 is disposed within housing flow chamber 24 so that fluid flow through housing flow chamber 24 can be manipulated or adjusted. Housing fluid outlet 28 is in fluid communication with nozzle head 40.

Figure 5:
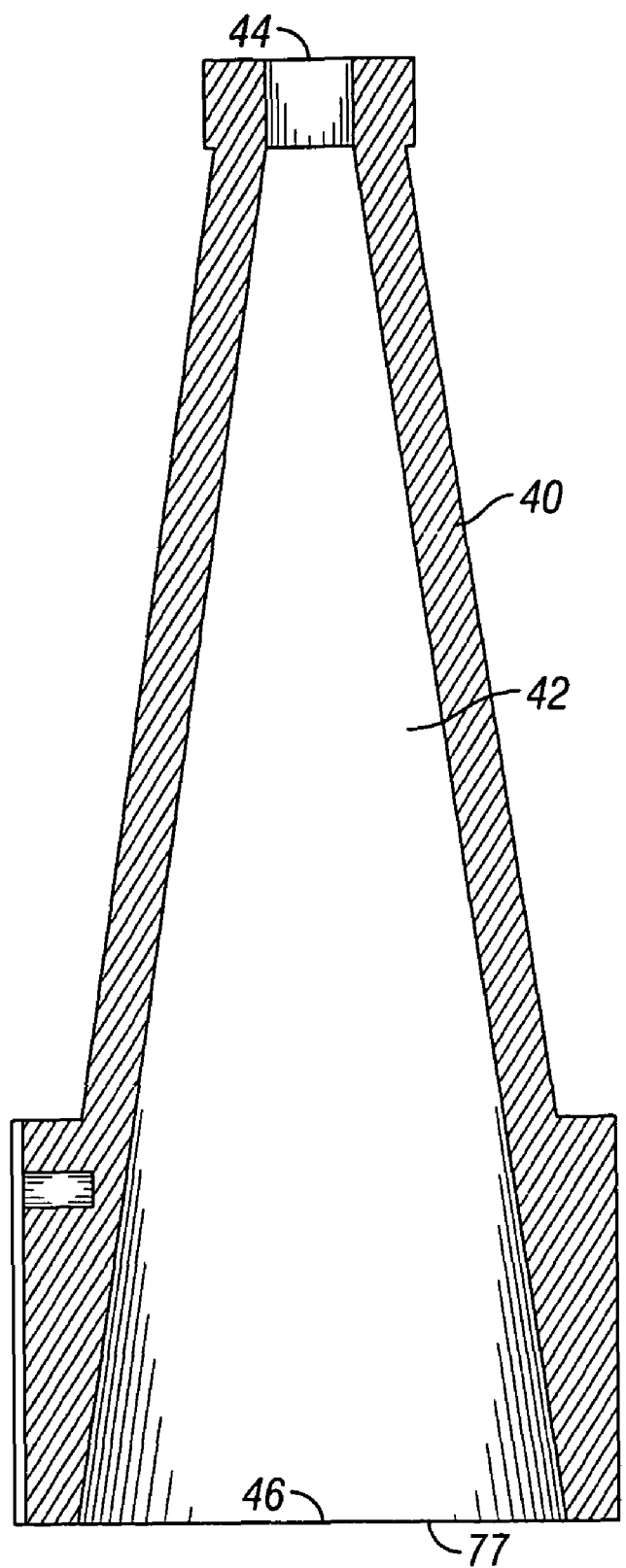
FIG. 5 is a plan view of a specific embodiment of a nozzle head for the nozzle assembly shown in FIG. 1.
Figure 6:
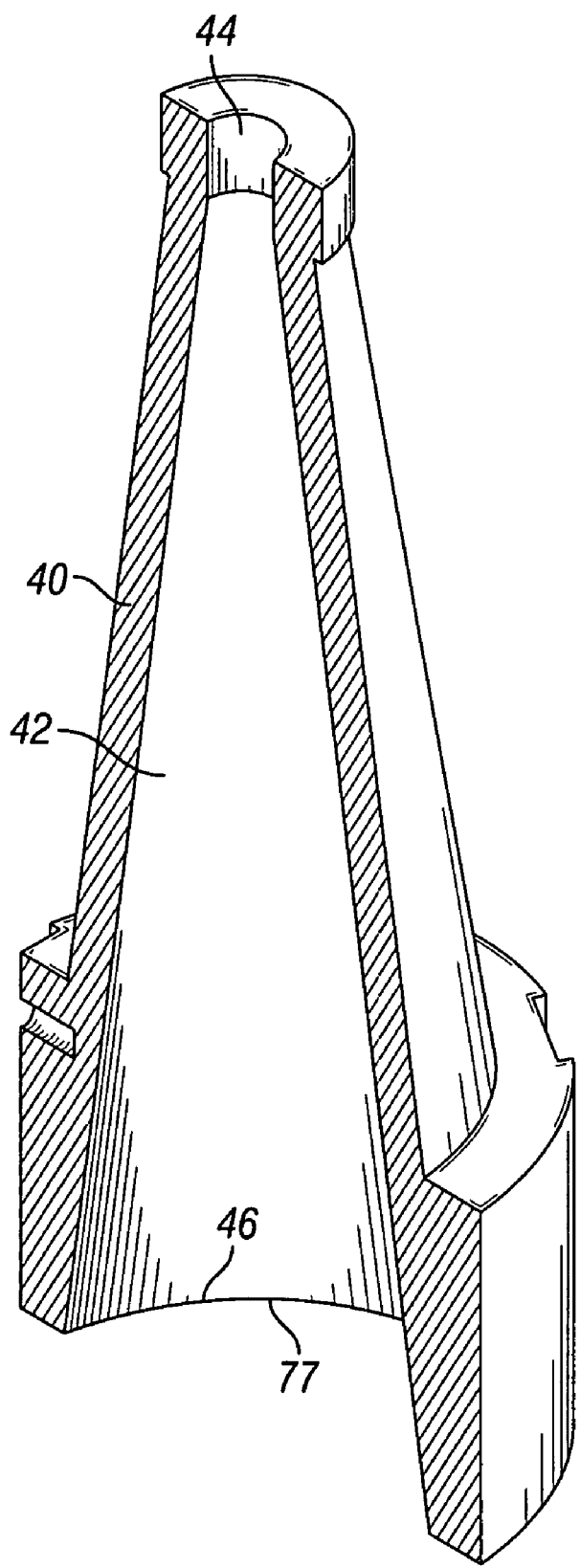
FIG. 6 is a perspective view of a specific embodiment of a nozzle head for the nozzle assembly shown in FIG. 1.

As illustrated in FIGS. 5-6, nozzle head 40 comprises a frustoconically-shaped portion 42 that is narrower at first end 44 and wider at second end 46. In other words, the outer diameter and the inner diameter of the frustoconically-shaped portion 42 is variable and diverges, that is, becomes larger going from first end 44 toward second end 46. Frustoconically-shaped portion 42 preferably has a smooth polished internal surface to promote fluid acceleration and flashing with minimal friction losses.

Referring back to FIGS. 1-4, nozzle head 40 is secured to housing 22 by support plate 50. Support plate 50 may be connected to housing 22 using any device or method known in the art, e.g., welding or use of fasteners such as bolts 100. Support plate 50 also includes devices for securing support plate 50 to, for example, a flash drum, also referred to as a flash fractionator or flash vessel (not shown herein, but described in greater detail in U.S. Pat. Nos. 4,938,876, 5,738, 762, 5,882,506, and 5,948,242), such as by bolts 120. Support plate 50 includes opening 52 for insertion and securing of nozzle head 40.

In the specific embodiment shown in FIGS. 1-4, emulsion fluid enters frustoconically-shaped portion 42 of nozzle head 40 at first end 44, and exits frustoconically-shaped portion 42 of nozzle head 40 at second end 46 via opening 77. In another embodiment (not shown), second end 46 can include an additional cylindrical portion of nozzle head 40 that is not frustoconically-shaped on the outside, and instead has a constant outer diameter.

Fluid flow is accelerated and the fluid undergoes a pressure drop while inside frustoconically-shaped portion 42 of nozzle head 40. The energy from the pressure drop is preferably converted to kinetic energy through acceleration of the fluid. As the pressure drops in nozzle head 40, the fluid expands and the constituent components of the fluid with the lowest boiling points flash in frustoconically-shaped portion 42 of nozzle head 40, with the result being further acceleration of the fluid towards and/or through opening 77 of nozzle head 40.

Upon exiting opening 77, the accelerated emulsion stream is directed toward, and impacts, front face 75 of impingement plate 70. Larger emulsion particles in the fluid are advantageously broken apart when the fluid flow from nozzle head 40 impacts impingement plate 70. Clean surfaces on the various constituent components of the emulsion fluid are exposed when the emulsion particles are broken apart. These exposed surfaces can then more easily interact with any surfactants that may be mixed with the fluid.

Kinetic energy is utilized in combination with the thermodynamic effects of sudden expansion to accomplish separation of the accelerated emulsion stream. The pressure drop across first end 44 of nozzle head 40 accelerates the fluid stream, and thermodynamic expansion generates the continued acceleration of the fluid stream.

One or more attachment members 60 can be disposed along the outer wall surface of nozzle head 40 to releasably secure impingement plate 70 to nozzle head 40. As shown in the specific embodiment of FIGS. 1-4, attachment members 60 are grooves 62 disposed in the outer wall surface of nozzle head 40 into which rails 64 (secured to impingement plate 70) can be placed in sliding engagement. Each rail 64 includes one or more slots 66 for insertion of a releasable fastener such as bolts 68. Tightening bolts 68 restricts movement of impingement plate 70 along the axial length of nozzle head 40, while loosening bolts 68 permits movement of impingement plate 70 along the axial length of nozzle head 40. Thus, the distance D between opening 77 of nozzle head 40 and impingement plate 70 can be adjusted to optimize separation of the emulsion constituents that impact face 75 of impingement plate 70 after being ejected from nozzle head 40.

Preferably, face 75 of impingement plate 70 is positioned approximately perpendicular to the direction of the fluid flow stream exiting opening 77 to maximize separation of the emulsion. If desired, however, face 75 of impingement plate 70 can be angled, tilted or otherwise positioned such that the stream exiting opening 77 can impact face 75 at various angles other than approximately ninety degrees. Thus, the degree of separation of the hydrocarbon emulsion can be affected by moving impingement plate 70 closer or further away from opening 77 of nozzle head 40 and/or by tilting or angling impingement plate 70 in various directions with respect to nozzle head 40. In a specific embodiment, impingement plate 70 may have a plurality of angled surfaces for controlling separation and/or directing flow in one or more desired directions.

In operation, a tip end of button plug 31 is preferably positioned midway down the initial straight section of housing flow chamber 24 and is used to control the pressure drop across the top section of nozzle assembly 20. Button plug 31 is easily replaceable in operation due to the top load design of nozzle assembly 20. Different sizes, shapes and diameters of button plug 31 can be utilized to allow for more precise control in different sections of nozzle assembly 20 to produce a wide range of flow rates. For example, button plug 31 can have a tapered shape (not shown), which would cause increased isenthalpic flashing in the straight bore section of 44 and continuing into 42 on nozzle assembly 20. Alternatively, button plug 31 can have a cylindrical shape as shown in FIG. 1, which would lead to increased isentropic flashing in frustoconically-shaped portion 42 of nozzle head 44.

Figure 7:
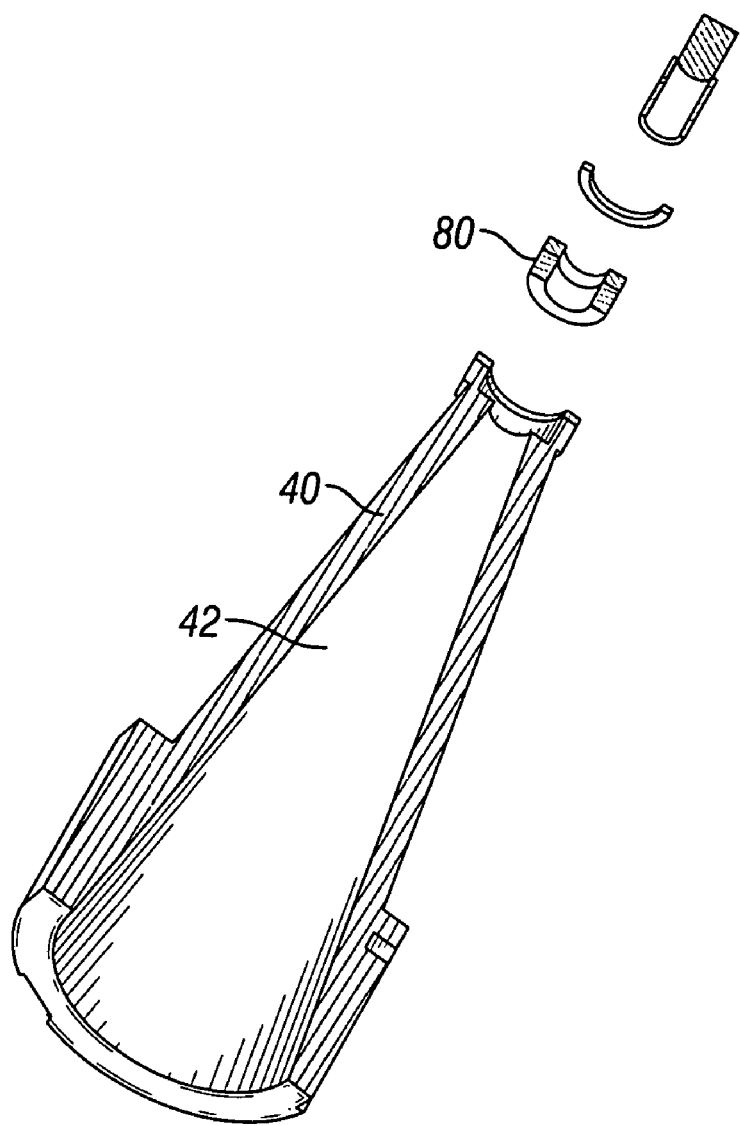
FIG. 7 is an exploded, perspective view of a specific embodiment of a nozzle head for the nozzle assembly shown in FIG. 1.
Figure 7:
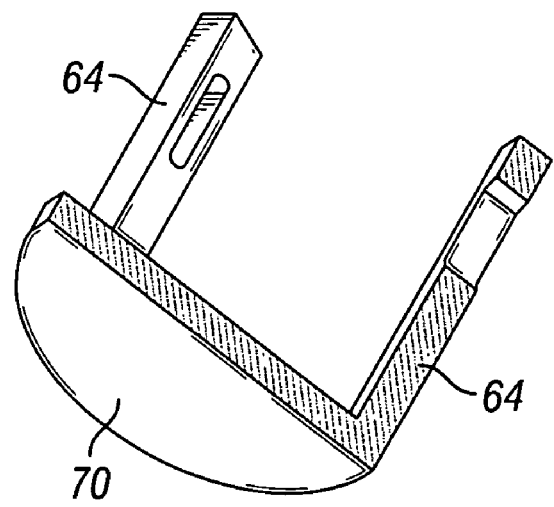
Figure 8:
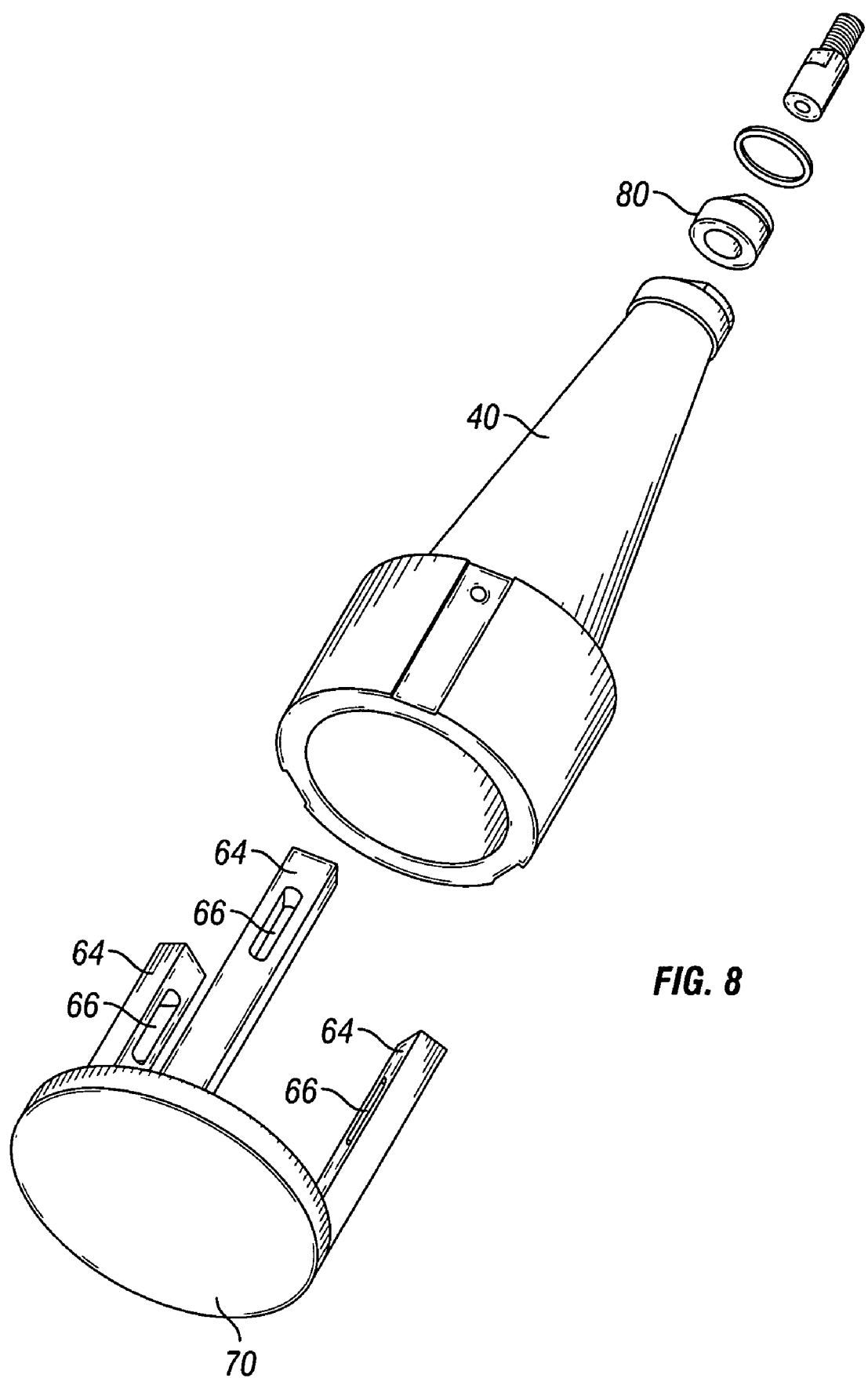
FIG. 8 is a exploded, cross sectional perspective view of a specific embodiment of a nozzle head for the nozzle assembly shown in FIG. 1.

In a specific embodiment as illustrated in FIGS. 7-8, an insert member 80 is disposed within or adjacent to first end 44 of nozzle head 40. Insert member 80 may be formed of tungsten carbide, ceramic or a similar wear resistant material. Insert member 80 can be slidingly insertable into first end 44 of nozzle head 40, or can be removeably attachable to nozzle head 40 by threading or some other form of attachment. Insert member 80 protects nozzle head 40 from wear caused by fluid flow.

Nozzle assembly 20 may be used in any process for separating hydrocarbon emulsions. In particular, nozzle assembly 20 may be used as the nozzle in the systems and methods disclosed in U.S. Pat. Nos. 4,938,876, 5,738,762, 5,882,506, and 5,948,242, all of which are incorporated herein in their entirety by reference. Broadly, in one specific embodiment, hydrocarbon emulsions in the fluid can be separated or broken apart by passing the fluid through nozzle assembly 20. The fluid can initially be passed through a first section, e.g., chamber 24, of nozzle assembly 20. Flashing will initially occur downstream of button 31, at or near first end 44 of nozzle head 40, thereby causing a pressure drop in the fluid. This flashing step causes water-oil emulsions to be at least partially broken into their separate components as described in U.S. Pat. No. 4,938,876, incorporated herein by reference for all purposes. The hot, pressurized stream of crude oil and its additives is flashed to the extent that 1 to 15 percent, and preferably 1 to 8 percent, of the emulsion's water vaporizes and is ultimately removed by, for example, being directed into a separate flash vessel, or vapor-liquid separator. Further, the vaporized light ends of the crude oil stream can be passed out overhead to a separate condenser and run-down tank. The condensed vapors will yield a water layer and a hydrocarbon layer above it. Both of these layers may be recycled or removed.

After passing through chamber 24, the flashed vapor and the accompanying unflashed fluid pass through the second section, e.g., nozzle head 40, of nozzle assembly 20, thereby delivering the directional flow of the fluid towards impingement plate 70. In a specific embodiment, impingement plate 70 has a projected area on its face 75 that matches the angled outlet at opening 77 of nozzle assembly 20 from which flow exits. Finally, after exiting nozzle head 40, the fluid can be deflected off of impingement plate 70 in a third section of nozzle assembly 20 such that hydrocarbon emulsions in the fluid are further broken apart into various constituent components.

If desired, the angular position of impingement plate 70 and/or distance D between impingement plate 70 and the second section of nozzle assembly 20 can be adjusted just prior to the step of deflecting the fluid off of impingement plate 70. By adjusting distance D between impingement plate 70 and the second section of nozzle assembly 20, the emulsion particles with the largest mass can be directed towards impingement plate 70 while the optimum flow velocity for achieving emulsion separation for the fluid stream can be achieved.

Larger particles with the greatest kinetic energy will not be carried in the stream if there is a sudden change in direction. There are viscous influences from the liquid/vapor stream that will carry the smallest particles within the stream. Larger particles will have enough momentum so that they cannot be carried by the stream. This results in the larger particles impacting impingement plate 70. The greater the distance D, the more time there is for the larger particles to change direction. Hence, adjusting distance D will influence the size of the particle that impacts impingement plate 70 and the energy that is removed.

Without impingement plate 70, the large particles lose kinetic energy due to friction with the vapor/gas in the flash vessel. The objective is to flash as much of the fluid stream as possible and gently let the constituents settle. If the flashed fluid is allowed to impact the liquid layer, it will readily remix the components with the possibility of creating a new emulsion. Adjustment of distance D between impingement plate 70 and the opening 77 of nozzle 40 advantageously allows for transferring the constituents to conglomerate without aggressive mixing and provides the optimum balance between high fluid velocity and ensuring that the emulsion particles are substantially all fractured.

Suitable emulsion-breaking chemicals can added as needed to the hydrocarbon emulsion at any time before, during or after passing through nozzle assembly 20, in amounts in the range of 100 to 2000 ppm by volume, depending on the nature of the emulsion. The chemicals may be surfactants, demulsifiers, chelating agents, or neutralizers as also described in U.S. Pat. No. 4,938,876. In a specific embodiment, the emulsion-breaking chemicals are added prior to the fluid impacting impingement plate 70 to promote mixing. Suitable chemicals are well-known and are readily obtained from Petrolite, BetzDearbom, Nalco or other suppliers. They are optional, depending upon treating requirements of a given crude oil, as is well known by operating in the art, and are used as needed in only small quantities. The additives may include anionic, cationic, nonionic and polymeric additives. Polymeric additives are used in relatively small dosages to encourage coagulation of extremely fine solid contaminants.

When the emulsions encountered are of the oil-in-water type, it is desirable to add a surfactant favoring water-in-oil emulsions. Conversely, if the emulsions expected are of the water-in-oil type, a surfactant favoring oil-in-water emulsion should be used. Only small quantities of these counter-emulsifiers should be necessary because over dosing can be counter productive.

It is to be understood that the invention is not limited to the exact details of construction, operation, exact materials, or embodiments shown and described, as modifications and equivalents will be apparent to one skilled in the art. For example, properties and components of various samples of crude oil can be determined by simple experimentation, and based upon such analyses, the specific parameters of use for related processing equipment can be determined and engineered. Accordingly, the invention is therefore to be limited only by the scope of the appended claims.

What is claimed is:

1. A nozzle assembly for separating hydrocarbon emulsions in a fluid, comprising:
   a housing; a housing fluid flow inlet; a housing fluid flow outlet; a flow chamber for facilitating fluid flow from the housing fluid flow inlet to the housing fluid flow outlet;
   a nozzle head having a first end and a second end, the first end being disposed adjacent to the housing fluid flow outlet, the first end and the second end defining a fluid flow passage therebetween for facilitating fluid flow from the first end to the second end;
   an impingement plate disposed in a spaced relationship from the second end of the nozzle head such that fluid flow exiting the second end of the nozzle head impacts the impingement plate and hydrocarbon emulsions in the fluid are thereby separated; and
   wherein one or more attachment members are disposed along an outer wall surface of the nozzle head to releasably secure the impingement plate to the nozzle head.

2. The nozzle assembly of claim 1, wherein the impingement plate is movable with respect to the nozzle head such that the distance between the impingement plate and the second end of the nozzle head can be varied.

3. The nozzle assembly of claim 1, wherein the attachment members are grooves disposed in the outer wall surface of the nozzle head.

4. The nozzle assembly of claim 3, wherein one or more rails are secured to the impingement plate and are slidingly engageable with the grooves in the nozzle head.

5. The nozzle assembly of claim 4, wherein the rails include one or more slots for insertion of a releasable fastener for restricting movement of the impingement plate along the axial length of the nozzle head.

6. The nozzle assembly of claim 1, wherein the impingement plate has a face that is positioned perpendicular to the direction of the fluid flow steam exiting the second end of the nozzle head such that the fluid flow stream can impact the face at a ninety degree angle.

7. The nozzle assembly of claim 1, wherein the impingement plate has a face that can be tilted such that the fluid flow stream exiting the second end of the nozzle head can impact the face at an angle other than ninety degrees.

8. The nozzle assembly of claim 1, wherein the impingement plate has a face with a plurality of angled surfaces for directing flow of the fluid flow stream impacting the face in one or more directions.

9. A nozzle assembly for separating hydrocarbon emulsions in a fluid, comprising:
- a housing; a housing fluid flow inlet; a housing fluid flow outlet; a flow chamber for facilitating fluid flow from the housing fluid flow inlet to the housing fluid flow outlet;
- a nozzle head having a first end and a second end, the first end being disposed adjacent to the housing fluid flow outlet, the first end and the second end defining a fluid flow passage therebetween for facilitating fluid flow from the first end to the second end;
- an impingement plate disposed in a spaced relationship from the second end of the nozzle head such that fluid flow exiting the second end of the nozzle head impacts the impingement plate and hydrocarbon emulsions in the fluid are thereby separated;
- wherein the assembly includes an adjustment member with a button plug that is disposed within the flow chamber; and
- wherein the button plug has a cylindrical shape.

10. A nozzle assembly for separating hydrocarbon emulsions in a fluid, comprising:
- a housing; a housing fluid flow inlet; a housing fluid flow outlet; a flow chamber for facilitating fluid flow from the housing fluid flow inlet to the housing fluid flow outlet;
- a nozzle head having a first end and a second end, the first end being disposed adjacent to the housing fluid flow outlet, the first end and the second end defining a fluid flow passage therebetween for facilitating fluid flow from the first end to the second end;
- an impingement plate disposed in a spaced relationship from the second end of the nozzle head such that fluid flow exiting the second end of the nozzle head impacts the impingement plate and hydrocarbon emulsions in the fluid are thereby separated;
- wherein the assembly includes an adjustment member with a button plug that is disposed within the flow chamber; and
- wherein an insert member is disposed adjacent to the first end of the nozzle head to protect the nozzle head from wear caused by fluid flow.

11. The nozzle assembly of claim 10, wherein the insert member is formed of a wear resistant material.

12. The nozzle assembly of claim 11, wherein the wear resistant material is tungsten carbide.

13. The nozzle assembly of claim 11, wherein the wear resistant material is ceramic.

14. The nozzle assembly of claim 10, wherein the insert member is slidingly insertable into the first end of the nozzle head.

15. The nozzle assembly of claim 10, wherein the insert member is removeably attachable to the nozzle head.

* * * * *